United States Patent [19]

Mori et al.

[11] 4,392,224
[45] Jul. 5, 1983

[54] SPEECH PATH SWITCHING SYSTEM IN TIME-DIVISIONAL ELECTRONIC TELEPHONE SWITCHING SYSTEM

[75] Inventors: Hiromichi Mori, Kawasaki; Jun Matsumoto, Tama; Masanobu Fujioka, Tokyo, all of Japan

[73] Assignee: Kokusai Denshin Denwa Co., Ltd., Tokyo, Japan

[21] Appl. No.: 177,454

[22] Filed: Aug. 12, 1980

[30] Foreign Application Priority Data

Aug. 21, 1979 [JP] Japan ............................... 54-105520

[51] Int. Cl.$^3$ .......................................... H04Q 11/04
[52] U.S. Cl. ......................................... 370/67; 370/68
[58] Field of Search ...................... 370/67, 68, 66, 59

[56] References Cited

U.S. PATENT DOCUMENTS

| 3,678,205 | 7/1972 | Cohen et al. | 370/66 |
| 3,881,064 | 4/1975 | Schlichte | 370/67 |
| 4,093,827 | 6/1978 | Charransol et al. | 370/66 |

OTHER PUBLICATIONS

"Studies on Data Switch Accommodating Various Data Speeds", SE76-46, The Institute of Electronics and Communication Engineers of Japan, Sep. 1976, pp. 1-9.

Primary Examiner—Douglas W. Olms
Attorney, Agent, or Firm—Martin Novack

[57] ABSTRACT

A speech path switching system in time-divisional electronic telephone switching system for the full availably switching between k number of incoming highways and k number of outgoing highways and each highway having n number of telephone channels comprises (a) k number of speech path memories for temporarily storing telephone signals, provided for each incoming highway, (b) k number of input counters provided for each speech path memory for designating the input address of said speech path memory, said input counter being circularly incremented synchronized with the frame phase of the corresponding incoming highway, (c) k number of holding memories provided for each outgoing highway for designating the read out address of said speech path memory to substantially connect an incoming channel to an outgoing channel, and (d) k number of output counters provided for each holding memory for designating the read out address of the holding memory.

1 Claim, 7 Drawing Figures

SPEECH PATH SWITCHING SYSTEM IN TIME-DIVISIONAL ELECTRONIC TELEPHONE SWITCHING SYSTEM

BACKGROUND OF THE INVENTION

The present invention relates to the speech path switch for a time divisional telephone switching system, in particular, relates to the speech path switch which provides the full availability switching, having the function of the combined highway space switch and memory switch, between nk number of input circuits in which each of k number of incoming highways has n number of time divisioned circuits, and nk number of similar outgoing circuits.

The switching system having the function of the combined highway space switch and memory switch is called a "C" switch.

A prior C switch is shown in FIG. 1. In the figure, the reference numeral 1 is a speech path memory, 2 is a speech holding memory having nk words for nk speech paths. The reference numeral 3 is a counter the content of which changes cyclicly from zero to nk-1. The counter 3 is incremented by an input clock pulse having the period 1/(nk) wherein the time unit is the time-divisional multiplex frame period. The reference numeral 4 is a multiplexing circuit for multiplexing the incoming highway 6-1, 6-2, . . . 6-k to a single secondary highway 8, and 5 is a demultiplexing circuit for demultiplexing the single secondary output highway 9 to k number of outgoing highway 7-1, 7-2, . . . 7-k. The operation of the counter 3 is synchronized with the multiplexed frames on the secondary incoming highway 8, and when the i'th speech is on the secondary highway 8, the content of the counter 3 is (i). The information of the i'th speech path on the secondary highway 8 is stored in the address (i) of the speech path memory 1. Said address (i) of the memory 1 is provided from the counter 3. At the same time, said address (i) of the counter 3 is applied to the speech holding memory 2, and the information (j) in the address (i) of said speech holding memory 2 is read out. Said information (j) is applied to the speech path memory 1 as the address information to read out the address (j), the content of which is transmitted to an external circuit as the i'th speech path information on the secondary outgoing highway 9.

Similarly, the holding memory 2 has the content (i) in the address (j), and when the content of the counter 3 is (j), and j'th information on the secondary incoming highway 8 is written in the address (j) of the speech path memory 1, and at the same time, the content of the address (i) of the memory 1 is read out as the j'th speech path information which is transmitted to an external circuit through the secondary outgoing highway 9. Thus, the switching between the i'th speech path and the j'th speech path is performed. Each of the speech paths on the secondary incoming highway 8 corresponds of each of the highways 6-1, 6-2, . . . 6-k, respectively, and each of the speech paths on the secondary outgoing highway 9 corresponds to each of the outgoing highways 7-1, 7-2, . . . 7-k, respectively. Accordingly, since the switching between any speech path on the secondary incoming highway 8 and any speech path on the secondary outgoing speech path 9 can be carried out, the switching between any speech path in the highways 6-1 through 6-k and any outgoing speech path in the highways 7-1 through 7-k can be carried out.

However, the configuration of FIG. 1 has the following disadvantages.

The first desadvantage is that the speech path memory 1 and the holding memory 2 must operate at very high speed. As apparent from the above explanation, the speech path memory 1 is accessed (to write and to read) 2nk times in each time divisional multiplexed frame duration (=125 μS in a typical PCM telephone channel), and the holding memory 2 is accessed nk times in that duration.

The second disadvantage concerns the frame phases of multiplexed highways. The frame phases of all the incoming highways must be the same as one another. And, the frame phases of the outgoing highways are determined by the frame phase of the counter 3, and the frame phase of each highway can not be determined independently. Accordingly, when m number of C-switches (20-1, 20-2, . . . 20-m), and k number of S-switches (Space divisional switch matrix) (21-1, 21-2, . . . 21-K) positioned at the outputs of said C-switches are arranged as shown in FIG. 2 and frame aligners must be installed at all the interface portions of the incoming highways 22-1 through 22-m in order to provide the in-phase situation among the incoming highways. Further, it should be appreciated that the outputs of all the C-switches 23-1, 23-2, 23-3, . . . 23-m are in-phase condition. However, in order to transmit that in-phase condition from the outputs of the C-switches to the inputs of the S-switches, each of the transmission times between the m number of C-switches and k number of S-switches must be the same as one another. Accordingly, the length of the wire, and/or the location of each apparatus is severely restricted.

One solution for solving partially said first disadvantage is shown in the report entitled "Studies on data switch accommodating various data speeds". SE76-46, the Institute of Electronics and Communication Engineers of Japan, September 1976, page 6, in which a speech path memory is divided into k number of sub-memories each relating to the corresponding incoming highway. According to the solution, the number of access times of a memory is reduced to (k+1)/2k times as often as those in the case of FIG. 1, and it should be noted that access times are substantially half of those of FIG. 1 when the value k is large.

SUMMARY OF THE INVENTION

It is an object of the present invention to improve said prior speech path switching system by providing a new and improved speech path switching system which utilizes a low speed speech path memory and a low speed holding memory, which can handle any incoming frame phase, and provides outgoing frame phases which are independent from one another and are also independent from the incoming phases.

The above and other objects are attained by a speech path switching system in a time-divisional electronic telephone switching system for full availably switching between an incoming channel in a plurality of incoming highways and an outgoing channel in a plurality of outgoing highways comprising a speech path memory inserted between the incoming highways and the outgoing highways for temporarily storing the telephone signals to be switched; a plurality of holding memories provided for each outgoing highway for designating the read out address of said speech path memory to substantially connect an incoming channel to the selected outgoing channel, each holding memory having the corresponding output counter for designating a read out address of the holding memory; and an input counter for designating the write-in address of said speech path memory for each incoming channel.

BRIEF DESCRIPTION OF THE DRAWINGS

The foregoing and other objects of the present invention will become better understood by means of the following description and the accompanying drawings wherein.

DESCRIPTION OF THE PREFERRED EMBODIMENT

Figure 1:
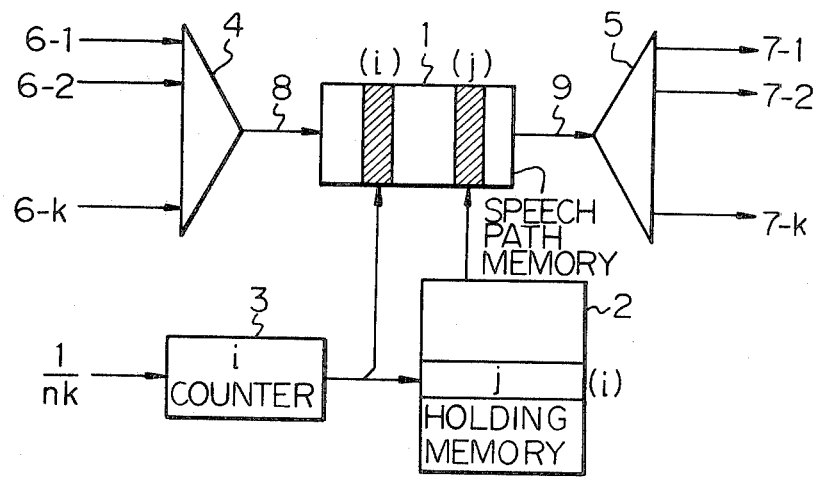
FIG. 1 is a block diagram of a prior C switch.
Figure 2:
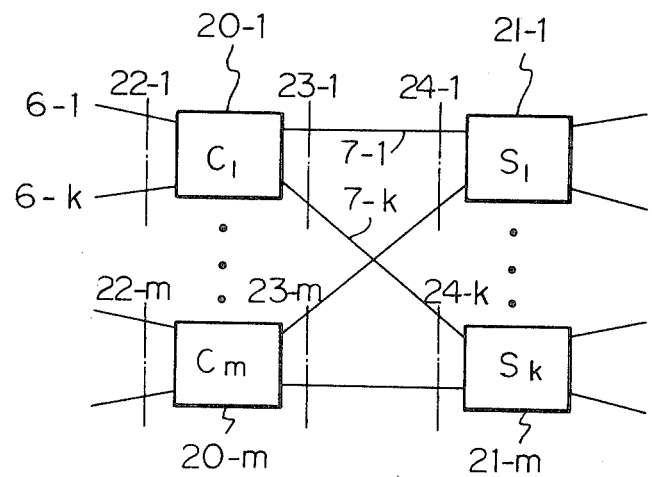
FIG. 2 is an explanatory drawing for the explanation of the large scale switching system having both the C switches and S switches, FIGS. 3A and 3B, when placed side-by-side, show a block diagram of the speech path switching system according to the present invention.
Figure 3A:
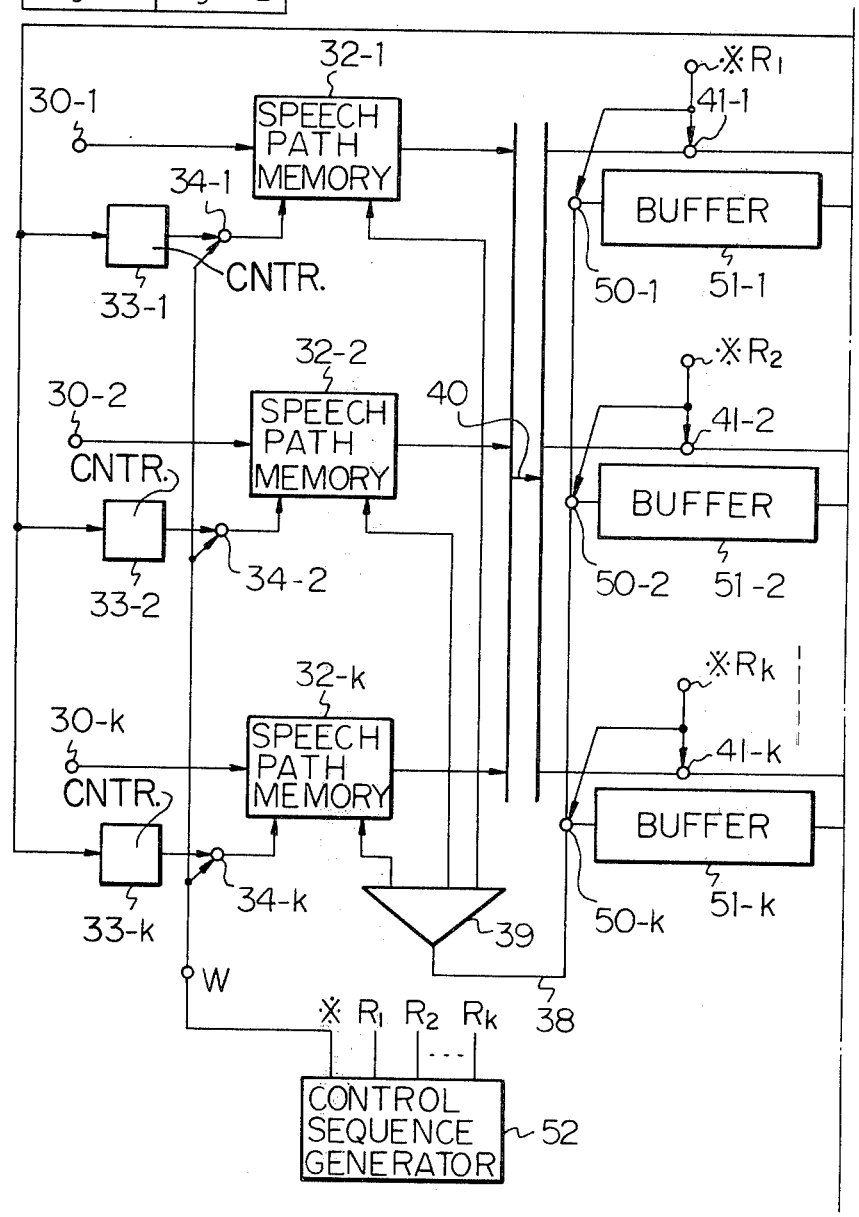
Figure 3B:
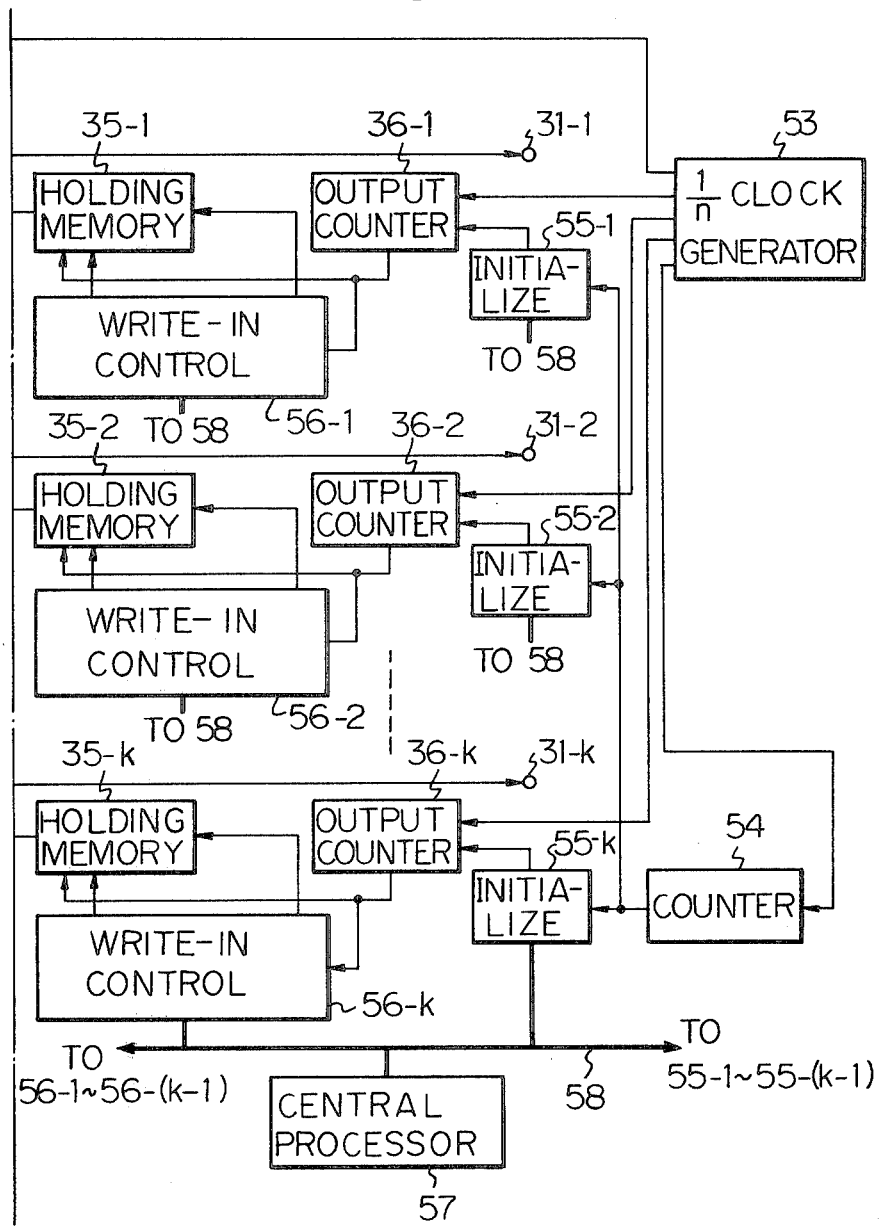
Figure 4:
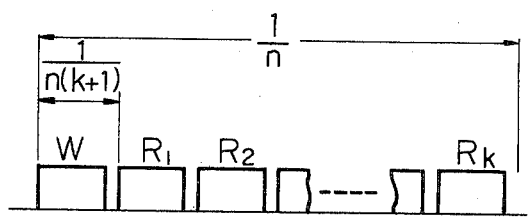
FIG. 4 is a time chart of the control signals in the apparatus of FIG. 3.

FIG. 3 is the block diagram of a speech path switching system according to the present invention. In FIG. 3, the reference numerals 30-1, 30-2, . . . 30-$k$ are incoming highways which correspond to 6-1, 6-2, . . . 6-$k$ in FIG. 1, 31-1, 31-2, . . . 31-$k$ are outgoing highways which correspond to 7-1, 7-2, . . . 7-$k$ in FIG. 1. The terminals W, $R_1$, $R_2$, . . . $R_k$ receive the input pulses as shown in the time sequence of FIG. 4 from the control sequence generator 52.

The period that the terminal W has the input pulse is called the input phase in which an input signal is stored in a speech path memory. The reference numerals 32-1, 32-2, . . . 32-$k$ are speech path memories each so provided as to correspond to each incoming highway. Each of speech path memories 32-1 through 32-$k$ has (n) word storages each corresponding to (n) number of speech channels multiplexed on each incoming highway, where (n) is an integer. The reference numerals 33-1, 33-2, . . . 33-$k$ are input counters each of which is incremented by a clock pulse having a period 1/n generated by a 1/n clock generator 53. And the content of each counter changes from 0 to n-1 cyclically synchronized with the frame phase of the corresponding incoming highway. When the control pulse signal is applied to the input terminal W, all the gate circuits 34-1, 34-2, . . . 34-$k$ open simultaneously, and the contents of the counters 33-1 through 33-$k$ are forwarded to the speech path memories 32-1 through 32-$k$, respectively, as the address information of those speech path memories. Then, the input signals on the incoming highways 30-1 through 30-$k$ are stored in the related speech path memories. The input phase finishes when those signals are written in the speech path memories.

Figure 5:
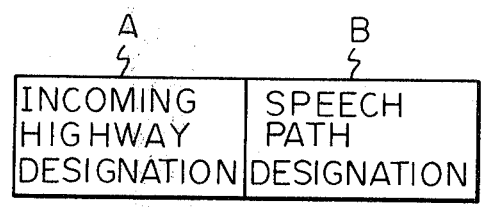
FIG. 5 is the example of the arrangement of word content of the holding memory in the apparatus of FIG. 3.

The period that one of the terminals $R_1$, $R_2$, . . . $R_k$ receives the control pulse is called the output phase, in which the content of the speech path memories is output on the related outgoing highway 31-1, 31-2, . . . 31-$k$. Since the control pulses $R_1$ through $R_k$ are provided sequentially one at a time, the output operation is carried out for each highway. In FIG. 3, the reference numerals 35-1, 35-2, . . . 35-$k$ are holding memories, 36-1, 36-2, . . . 36-$k$ are output counters, 50-1, 50-2, . . . 50-$k$ are gates, 51-1, 51-2, . . . 51-$k$ are buffer memories. It should be appreciated that each outgoing highway has the set of its own holding memory and output counter, while the embodiment of FIG. 1 has only the single set of holding memory and counter common to all the outgoing highways. Each output counter receives the clock pulse having the period 1/n from the clock generator 53, and the content of each counter changes from 0 to n-1 cyclically. In this case, each output counter is initialized by the related initialization circuit (55-1 through 55-$k$) so that each output counter is reset to zero at a different time. Accordingly, it should be appreciated that the content of the output counter is independent from that of other output counters. The instantaneous content of each output counter indicates the output channel on the outgoing highway. The contents of the holding memories 35-1, 35-2, . . . 35-$k$ correspond to the input channels on the incoming highways, and each word of the holding memories has the first information A which indicates the incoming highway, and the second information B which indicates the speech path on said incoming highway as shown in FIG. 5. Those informations A and B are provided from the central processor 57 as described later.

It is assumed that the control pulse is applied to the terminal $R_1$ in the output phase to the outgoing highway 31-1. It is supposed that the content of the output counter 36-1 is incremented by one during 1/n period of FIG. 4, or during $R_1$—$R_1$ cycle. The content of the output counter 36-1 is transferred to the holding memory 35-1 as the address information of the holding memory 35-1. Then, the content of the holding memory 35-1 thus addressed is read out to the high speed buffer memory 51-1. When the control pulse is applied to the terminal $R_1$, the gate 50-1 opens and the content of buffer memory 51-1 is transferred to the distribution circuit 39 through the gate 50-1 and the common control bus 38. The distribution circuit 39 switches the received information to each of the speech path memories according to the first information A in the content of the holding memory, that is to say, when the content of A is 2, the second information B is transferred to the second speech path memory 32-2 through that distribution circuit 39. The content of said speech path memory 32-2 addressed by the second information B is then read out and is transferred to the common information bus 40. The switching operation between the incoming highways and the outgoing highways is performed in a similar manner to that of FIG. 1, that is to say, the signal on the incoming highway is stored in the speech path memory according to the address indicated by the input counter, and said speech path memory is read out according to the address indicated by the holding memory.

The control pulse on the terminal $R_1$ opens also the gate 41-1. Therefore, the information read out on the common bus 40 is transferred to the output highway 31-1 through that gate 41-1.

As described above, when the control signal is applied to the terminal $R_1$, the switching operation is performed between speech channel on the incoming highway designated by the content of the holding memory and the speech channel on the outgoing highway 31-1 designated by the output counter 36-1. The similar operation is performed when the control pulse is applied to other terminals $R_2$, . . . $R_k$, alternately.

Figure 6:
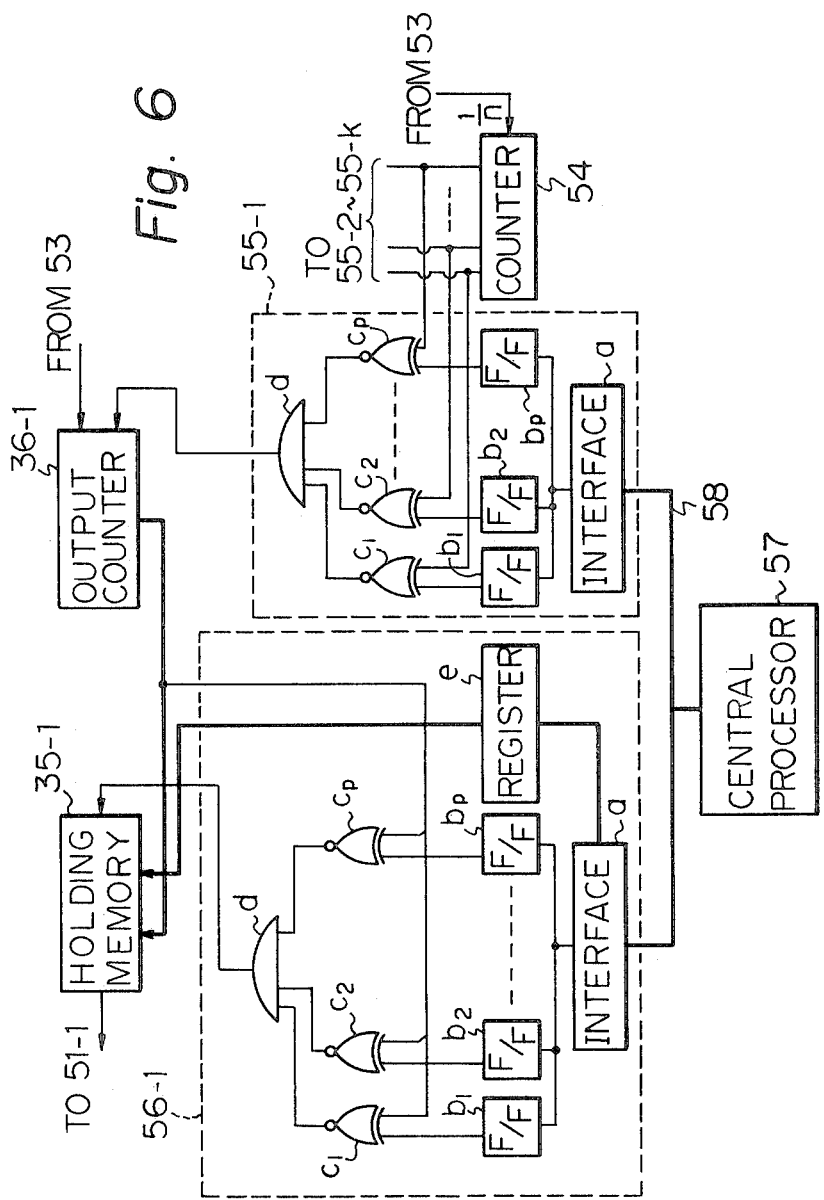
FIG. 6 is a detailed block diagram of the present system.

Now, the write control of a holding memory and the initialization control of an output counter are described in accordance with FIG. 6, which shows in detail the initialization circuit 55-1 and the holding memory write-in control circuit 56-1 for the first outgoing highway. Of course the configuration of those circuits for other output highways are completely the same as that of FIG. 6.

In FIG. 6, the output pulse of the 1/n clock generator 53 is applied to the counter 54, which counts the input pulses cyclically, and the respective bits of the content of the counter 54 are applied to the inputs of the exclusive-OR circuits ($c_1$ through $c_p$) in the initialization circuit 55-1. The initialization circuit 55-1 has a set of flip-flops ($b_1$ through $b_p$), which is connected to the central processor 57 through the bus 58 and the bus interface circuit (a), and each output of said flip-flops ($b_1$ through $b_p$) is applied to a respective input of the exclusive-OR circuits ($c_1$ through $c_p$). The contents of the flip-flops ($b_1$ through $b_p$) are determined by the central processor 57 so that said contents are different from those of other outgoing highways. When all the values of the bit positions of the counter 54 coincide with the contents of the flip-flops ($b_1$ through $b_p$), all the exclusive-OR circuits ($c_1$ through $c_p$) provide the outputs, and then, the AND circuit (d) provides the output signal, which resets the output counter 36-1 to zero. Therefore, the time that the output counter 36-1 is initialized (or reset to zero) is determined by the contents of the flip-flops ($b_1$ through $b_p$), which are controlled by the central processor 57 so that a set of flip-flops have different contents from those of other outgoing highways. And, when an output counter is initialized, that counter is incremented by the input pulses from the generator 53. Therefore, the content of an output counter is different from that of other output counters.

The holding memory write-in control circuit 56-1 has an interface circuit (a), a set of flip-flops ($b_1$ through $b_p$), a set of exclusive-OR circuits ($c_1$ through $c_p$), an AND circuit (d) and a register (e). When the central processor 57 intends to change the content of the No. M time slot of the holding memory 35-1, the central processor 57 stores the new content (A and B in FIG. 5) in the register (e), and sets the value (M) into the set of flip-flops ($b_1$ through $b_p$) through the bus 58 and the interface circuit (a). Then, when the content of the output counter 36-1 reaches the value M, all the exclusive-OR circuits ($c_1$ through $c_p$) provide the output signals, which cause the output signal of the AND circuit (d). The output of the AND circuit (d) is applied to the holding memory 35-1 as the write pulse, and thus, the holding memory is switched to the write mode during the write pulse. Therefore, the content of the register (e) is written in the holding memory 35-1 in that write mode, and thus, the content of the address corresponding to said time slot M of the holding memory 35-1 is changed under the control of the central processor 57.

As described above, according to the present invention, a plurality of input counters are provided for each incoming highway, and the content of each input counter changes cyclically synchronized with the frame phase of the incoming highway. Therefore, the frame phases of the incoming highways are not necessarily in-phase, and further, the input signals can be stored in the speech path memory in the form that the number of speech path channel in the frame coincides with the address of the speech path memory by the simple logic that the content of the counter corresponds directly to the address of the speech path memory. Further, according to the present invention, a plurality of output counters are provided, one for each outgoing highway and, therefore, the output phase of each counter is independent from that of other counters, and that output phase is defined by the initial value of the counter. Then, the frame phase on each outgoing highway can be designed arbitrarily by selecting the initial value of the counter. In this case, it should be noted that said arbitrary frame phase is obtained simply by applying the content of the output counter to the holding memory as the address information.

In the above embodiment, each of the speech path memories 32-1 through 32-$k$, the distribution circuit 39 and buffers 51-1 through 51-$k$ must operate $n(k+1)$ times in each frame period, since those circuits must operate $(k+1)$ times in each timeslot, where $(k+1)$ is the number of control pulses (W, $R_1$, ... $R_k$), and thus, those circuits must operate $n(k+1)$ times in each frame period. On the other hand, other circuits including holding memories 35-1 through 35-$k$, the input counters 33-1 through 33-$k$, the output counters 36-1 through 36-$k$ have only to operate n times in each frame period, since those circuits are provided for each incoming-/outgoing highways so that each of those circuits has only to operate n times, where n is the number of multiplexed channels in each frame. Therefore, the operation speed of the circuits except for the speech path memories, the distribution circuit and buffers may be slow. According to the preferred embodiment, the value k is $k=8$, the value n is $n=512$, and the timeslot frequency is 4 MHz, so the timeslot period is 0.25 $\mu S$). In that case, the speech path memory frequency is 36 MHz ($=(k+1)\times 4$) and the holding memory frequency is 4 MHz ($=8$ kHz$\times 512$) (cycle time is 0.25 $\mu S$), where the sampling frequency of each telephone channel is 8 kHz. Generally speaking, the high speed circuit like a CML circuit (current mode logic) is expensive and consumes much electricity. Since the present invention utilizes the small number of high speed elements only in the speech path memories the distribution circuit and the buffers, the present invention has the advantages that the price of the apparatus is reduced and the location design of elements can have greater freedom since the heat dissipation from elements is reduced. Further, the present invention provides the C-switch which allows less limitation to the frame phase of the incoming highways, and provide the desired outgoing frame phase according to the request of the succeeding stage. Accordingly, when a large scale exchange system is constructed by combining the switches thus described, the location of each apparatus and/or the length of the wire between apparatuses are not restricted.

From the foregoing, it will now be apparent that a new and improved speech path switching system in a time divisional electronic telephone switching system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A speech path switching system in a time divisional electronic telephone switching system for full availability switching between an incoming channel in a plurality of incoming highways and an outgoing channel in a plurality of outgoing highways comprising:

a plurality of speech path memories each coupled with a related incoming highway for temporarily storing the telephone signals to be switched;

each of said speech path memories having a related input counter for designating the address of a speech path memory, said input counter being incremented in synchronism with the frame phase of the corresponding incoming highway, the received information on an incoming highway being stored in an address designated by the instantaneous content of the input counter in the corresponding speech path memory;

a plurality of holding memories, each operable to designate the read out address of a speech path memory to effectively connect an incoming channel to a selected outgoing channel;

a holding memory being provided for each related outgoing highway, each holding memory having a corresponding output counter for designating the read out address of the holding memory;

the circulation phase of each output counter being independently adjustable, the frame phase of each outgoing highway being independent from the other outgoing highways by adjusting each output counter independently.

* * * * *